United States Patent
Rietveld et al.

[11] Patent Number: 6,022,599
[45] Date of Patent: Feb. 8, 2000

[54] DISPLAY UNIT, AND METHOD FOR MANUFACTURING A DISPLAY UNIT

[76] Inventors: Matthijs Alphons Rietveld, Haugweide 36, 2515 RV Der Hagg; Martin Cornelis Meijers, Persynlaan 6, 2614 AA Delft, both of Netherlands

[21] Appl. No.: 09/062,489

[22] Filed: Apr. 17, 1998

[30] Foreign Application Priority Data

Oct. 20, 1995 [NL] Netherlands ............................ 1001454
Jul. 26, 1996 [NL] Netherlands ............................ 1003691
Oct. 15, 1996 [WO] WIPO ...................... PCT/NL96/00398

[51] Int. Cl.⁷ ................................ A47G 1/06; B29G 45/14
[52] U.S. Cl. ................................. 428/14; 428/13; 428/38; 428/77; 40/718; 40/720; 40/765; 40/766
[58] Field of Search .................................. 428/13, 14, 38, 428/77; 40/718, 720, 765, 766

[56] References Cited

FOREIGN PATENT DOCUMENTS

| 0 322 518 | 9/1989 | European Pat. Off. . |
| 758864 | 1/1934 | France . |
| 1072027 | 9/1954 | France . |
| 2053627 | 4/1971 | France . |
| 43 15 146 A1 | 11/1994 | Germany . |
| 1182958 | 4/1970 | United Kingdom . |

*Primary Examiner*—David Brunsman
*Attorney, Agent, or Firm*—Thomas R. Vigil

[57] ABSTRACT

Method for manufacturing a display unit, which display unit comprises a first plate-type element and a second plate-type element made of transparent material, situated essentially parallel to the first plate-type element and serving as a window, and a frame made of flexible material which is moulded in an undetachable manner onto at least part of the periphery of one of the two plate-type elements, and which holds the two plate-type elements together, while a replaceable picture carrier of sheet-like or film-like material can be placed between the two plate-type elements. The first plate-type element and the second plate-type element are place together in an injection mould, without the picture carrier placed between them. Subsequently, in an injection moulding process, the frame of flexible plastic material is moulded in an undetachable manner onto at least part of the periphery of one of the two plate type elements.

12 Claims, 2 Drawing Sheets

DISPLAY UNIT, AND METHOD FOR MANUFACTURING A DISPLAY UNIT

The present invention relates to a method for manufacturing a display unit according to the preamble of claim 1.

FR 758,864 discloses a display unit in which the first plate-type element forming the rear wall of the display unit and the frame situated around its periphery form one unit made of flexible rubber, which frame is glued or moulded during vulcanization onto the first plate-type element. The frame has a groove on the inside for the accommodation of the transparent second plate-type element, which covers the picture carrier as a window. Good sealing of the space between the two plate-type elements, for example to keep out dust and water, is desirable for the protection of the picture carrier, which is generally made of printed paper.

The known method has the disadvantage that adequate sealing of the seam between the frame and the second plate-type element is guaranteed only if the thickness and the peripheral dimensions of the second plate-type element lie within a small tolerance range. During production, a small tolerance range leads to a high waste percentage, and thus to a high-cost display unit.

The object of the present invention is to provide a method which makes it possible to manufacture low-cost display units which guarantee good protection of the replaceable picture carrier.

This object is achieved by a method according to the preamble of claim 1, which is characterized in that the first plate-type element and the second plate-type element are placed together in an injection mould, without the picture carrier placed between them, and in that subsequently in an injection moulding process the frame of flexible plastic material is moulded in an undetachable manner onto at least part of the periphery of at least one of the two plate-type elements. Placing both plate-type elements in the mould together ensures that the frame abuts accurately to the two plate-type elements, with the result that differences occurring in practice in the thickness and the peripheral measurement of the plate-type elements do not have an adverse effect on the sealing of the space between the two plate-type elements, in which space a picture carrier is subsequently placed.

It is pointed out that GB 1,182,958 discloses a display unit in which an expensive picture carrier is situated between a first plate-type element forming the rear wall and a second plate-type element forming a glass window. In order to guarantee dustproof and watertight protection of the picture carrier for a long time, and in order to keep the two plate-type elements with the picture carrier between them together, a coating of a hard-setting elastomeric material of a special composition is subsequently spread around the periphery. In the case of this known display unit the picture carrier can be removed only by breaking the layer of elastomeric material.

In particular, the materials of the first plate-type element, the second plate-type element and the frame are such that during the injection moulding process the material of the frame is moulded in an undetachable manner onto only one of the two plate-type elements, in particular onto the first plate-type element. In this case the frame has such a cross-section that it can retain, in a detachable manner, the other plate-type element onto which it is not moulded.

Further advantageous embodiments and advantages of the invention are described in the subclaims and the description which follows of exemplary embodiments of the display unit according to the invention shown in the drawing, in which:

BRIEF DESCRIPTION OF THE DRAWINGS

The display unit shown in FIG. 1 comprises a rectangular first plate-type element 1, which serves as the rear wall of the display unit, a rectangular second plate-type element 2, made of a transparent material, situated above the first plate-type element, which serves as a window, and a frame 3. In FIG. 1 the frame 3 is connected in an undetachable manner to the entire periphery of the first plate-type element 1 and has such a cross-section that it retains the second plate-type element 2 in a detachable manner.

The first plate-type element 1 can be of any suitable material, for example wood or stiff cardboard. The first plate-type element is preferably a sheet of plastic material, for example PP, PC, PE, PET, PS, PA, PVC, ABS, SAN or PMMA.

The transparent second plate-type element 2 is preferably made of transparent plastic material, for example PP, PC, PE, PET, PS, PA, PVC, ABS, SAN or PMMA.

The frame 3 is made of an injection mouldable and flexible material, for example a thermoplastic elastomer (TPE), in particular styrene block copolymers such as SBS (polystyrene-polybutadiene-polystyrene) and SEBS (polystyrene-polyethylene-butylene-polystyrene), or PP/EPDM (polypropylene/ethylene-propylene diene monomer), or TPU (thermoplastic polyurethane), or SEPT (polystyrene-polyethylene polypropylene-polystyrene), or rubber.

The picture carrier 4 is, for example, a photograph, poster or drawing, or another illustration applied to a film-type or sheet-type material.

Figure 2:
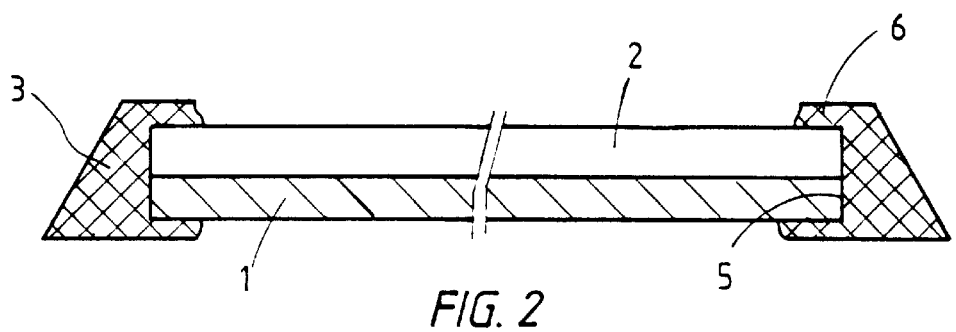
FIG. 2 shows a section along the line II—II in FIG. 1 during moulding-on of the frame.

An injection mould (not shown) is used for manufacturing the abovementioned embodiment of the display unit. Both the first plate-type element 1 and the second plate-type element 2 are placed in said mould. The material for the frame 3 is then injected into a cavity formed by the closed mould, with the result that the cross-section shown in FIG. 2 is obtained. The choice of material for the first plate-type element 1, the second plate-type element 2, and the frame 3, is such that the material of the frame 3 adheres in an undetachable manner only to peripheral edge 5 of the first plate-type element 1, and not to the second plate-type element 2. As can be recognized in FIG. 2, the cavity in the mould is designed in such a way that the frame forms an inward projecting edge 6. Since the frame 3 is made of flexible material, the second plate-type element 2 can be removed from the frame 3 after the display unit has been removed from the mould, so that the picture carrier 4 can be placed on the first plate-type element 1. The second plate-type element 2 can then be placed in the frame 3 again. The resilience of the flexible edge 6 has the effect that the second plate-type element 2 is pressed hard against the picture carrier 4, and dustproof, spatterproof and watertight protection of the picture carrier 4 is obtained. It is clear that a picture carrier 4 placed in the display unit is simple to replace with another one.

Placing the two plate-type elements 1 and 2 together in an injection mould for moulding-on of the peripheral frame ensures that there is an accurately fitting interface between the frame 3 and the second transparent plate-type element 2. This is important if the display unit is being used as a floor display unit for showing the picture carrier 4 from the ground. In that application people walk over the transparent second plate-type element 2. The accurate fitting of the frame 3 ensures that people cannot trip over the interface between the second plate-type element 2 and the frame 3, or that the second plate-type element 2 cannot come out of the frame 3 as a result of shearing forces exerted thereon. When being used as a floor display unit, the transparent plate-type element is preferably scratchproof and slightly roughened, so that a person walking over it does not damage the element and does not slip on it himself.

It will be clear that the display unit is also suitable as, for example, a holder for fixing to the wall for posters, but also as a mouse pad, pay mat, table display or desk display. For use as a mouse pad, the transparent plate-type element is also preferably slightly roughened, so that the ball of the mouse has a good grip on it.

Figure 1:
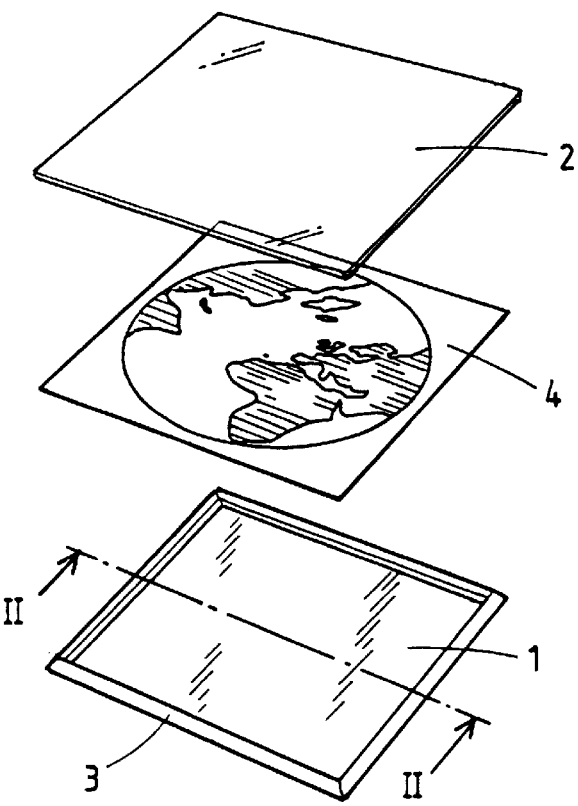
FIG. 1 shows in perspective a disassembled view of first embodiment of a display unit manufactured according to the invention.
Figure 3:
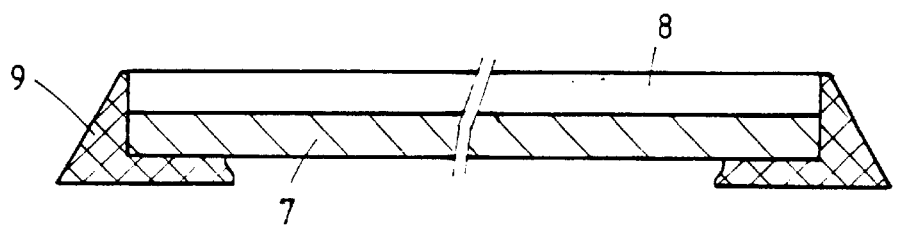
FIG. 3 shows a view corresponding to FIG. 2 of a second exemplary embodiment of a display unit manufactured according to the invention.

In a variant of the display unit described with reference to FIGS. 1 and 2, which variant is illustrated in the section of FIG. 3, frame 9 is connected in an undetachable manner to the periphery of transparent second plate-type element 8, and the frame 9 has a cross-section allowing it to retain first plate-type element 7 in a detachable manner therein. This variant is advantageous if it is desirable for the display unit to be dustproof and watertight at the side of the second plate-type element.

For the manufacture of the display unit according to FIG. 3 also, the first and the second plate-type elements 7, 8 are placed together in an injection mould, following which the frame 9 is moulded on by injection moulding. However, the choice of material of the two plate-type elements 7, 8 and the frame 9 is such that the material of the frame 9 adheres in an undetachable manner only to the periphery of the second plate-type element 8.

Figure 4:
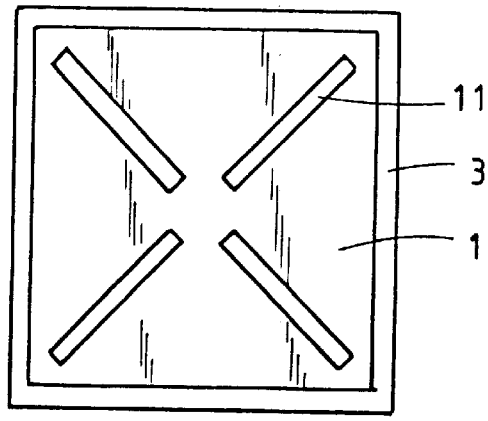
FIG. 4 shows a view of the rear side of the display unit in FIG. 1.

The view in FIG. 4 shows antislip devices 11 fitted at the rear side of the first plate-type element 1. Said antislip devices are preferably made of the same material as the frame 3 and are preferably moulded onto the first plate-type element 1 simultaneously with the moulding-on of the frame 3. In particular when the display unit is being used as a floor display unit which rests on the ground, the antislip devices 11 produce relatively great friction between the display unit and the floor.

For applications in which the display unit must not slip at all, the first plate-type element 1 can also be coated with an adhesive layer (not shown). Said adhesive layer can in turn be protected by a film which can be removed in one piece or in parts therefrom. The above-mentioned antislip devices are not necessary in that case.

An antenna can also be formed by injection moulding at the same time as the frame and/or the antislip devices are being moulded on. The antenna can, for example, react to a (coded) chip card, so that, for example, a doorunlocking floor display unit can be obtained, or a presentation or instruction apparatus is switched on.

It goes without saying that the display unit can also be a different shape from the rectangular one described here.

Figure 5:
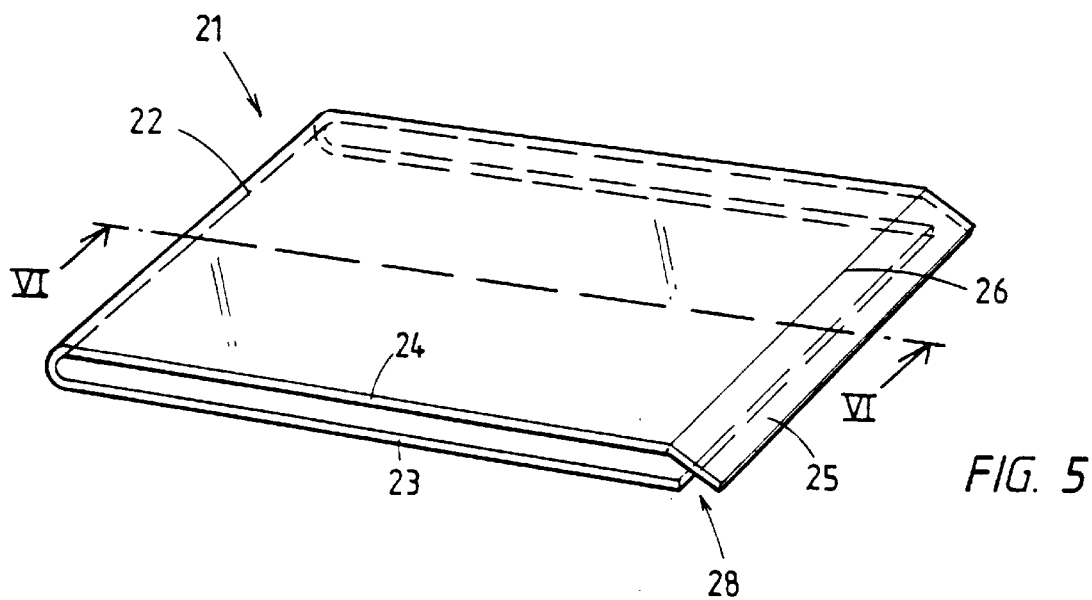
FIG. 5 shows in perspective a view of the folded basic element of a third exemplary embodiment of a display unit manufactured according to the invention.
Figure 6:
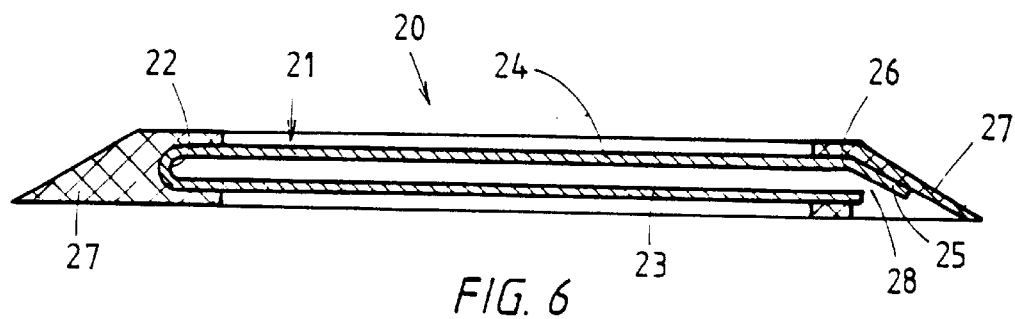
FIG. 6 shows a section along the line VI—VI in FIG. 5 of the third exemplary embodiment of a display unit manufactured according to the invention.

FIG. 5 shows a basic element 21 used for manufacturing an embodiment of a display unit 20 shown in vertical cross-section in FIG. 6. The basic element 21 is folded from a single flat sheet of transparent plastic material, preferably PP, PC, PE, PS, PET, PA, PVC, ABS, SAN or PMMA. The flat sheet in this case can be obtained by punching out of a basic sheet, where one or more fold lines or fold points can also be made simultaneously in one punching operation. The basic element 21 is folded approximately in its centre about a fold line 22, one half forming the first plate-type element 23 of the display unit 20, while the other half forms the second plate-type element 24 of the display unit 20. The fold is considerably sharper in practice than that shown in FIG. 5. The distance between the two plate-type elements 23 and 24 is in fact nil, but is just enough for sliding a sheet-like picture carrier between them.

It can be seen in FIG. 5 that the part of the basic element 21 forming the second plate-type element 24 has an edge part 25 thereof facing away from the fold line 22 which projects slightly beyond the first plate-type element 23. This edge part 25 is also bounded by a corresponding fold line 26, the edge part 25 being folded about this fold line 26 at an angle in the direction of the first plate-type element 23.

The basic element 21 shown in FIG. 5 is placed in one piece in a suitable injection mould, in such a way that the first plate-type element 23 and the second plate-type element 24 press hard against each other. Material is then injected into the mould cavity, in order to form a peripheral frame 27, which can be seen in section in FIG. 6. The peripheral frame runs around all four sides of the basic element 21 and on at least one, and preferably on three, of the four sides, forms an permanent connection between the plate-type elements 23, 24. At the position of the edge part 25, between the edge part 25 belonging to the second plate-type element 24 and the adjacent side of the first plate-type element 23, a slit-shaped opening 28 extending virtually over the full length of that side is left clear for subsequently inserting and removing a picture carrier.

It is important that the side of the edge part 25 facing the first plate-type element 23 remains clear of the material of the frame 27, so that when a picture carrier is being inserted, said picture carrier slides along the relatively smooth material of the basic element 21. If the material of the frame 27 were present at the position of the opening 28, too much friction would occur, and the picture carrier could crumple during insertion.

A display unit described with reference to FIGS. 5 and 6 is particularly suitable as a mouse pad or other display or mat to be placed on the floor, table, desk or counter. Due to the fact that the frame is made of flexible material, it is possible to put one's hand between the two plate-type elements 23 and 24, so that a picture carrier can be placed or removed without damaging the display unit, in particular the frame 27 thereof. The resilience of the frame 27 ensures that the opening 28, which is shown very large in FIG. 6 purely for the sake of clarity, is virtually shut off, with the result that the picture carrier is protected against damage.

A variant (not shown) of the display unit described above with reference to FIG. 6 has a basic element which is formed by welding one edge side of two loose plate-type elements together.

Another variant (not shown) of the display unit described above with reference to FIG. 6 has no basic element, but has two loose plate-type elements, for example a non-transparent bottom and a window. The materials of the two loose plate-type elements are in this case such that the material of the frame can be moulded in an undetachable manner onto both elements during the injection moulding process.

For an application such as a mouse pad, counter display or horizontal floor display, it is also advantageous to provide the bottom side of the first plate-type element 23 with antislip devices.

We claim:

1. Method for manufacturing a display unit, which display unit comprises a first plate-type element and a second plate-type element, made of transparent material, situated essentially parallel to the first plate-type element and serving as a window, and a frame made of flexible material which is moulded in an undetachable manner onto at least part of the periphery of at least one of the two plate-type elements, and which holds the two plate-type elements together, while a replaceable picture carrier of sheet-like or film-like material can be placed between the two plate-like elements, wherein the first plate-type element and the second plate-type element are placed together in an injection mould, without the picture carrier placed between them, and in that subsequently in an injection moulding process the frame of flexible plastic material is moulded in an undetachable manner onto at least part of the periphery of at least one of the two plate-type elements.

2. Method according to claim 1, in which the materials of the first plate-type element, the second plate-type element and the frame are such that during the injection moulding process the material of the frame is moulded in an undetachable manner onto only one of the two plate-type elements.

3. Method according to claim 2, in which the materials of the first plate-type element, the second plate-type element and the frame are such that during the injection moulding process the material of the frame is moulded in an undetachable manner only onto the periphery of the first plate-type element.

4. Method according to claim 1, in which the first plate-type element and the second plate-type element are made by folding a plate-type basic element about a fold line thereof, following which the first and second plate-type elements connected to each other by way of the fold line are place together in the mould, and the frame is then moulded in an undetachable manner onto both plate-type elements, in such a way that at least one side of the display is open for placing a picture carrier between the plate-type elements.

5. Method according to claim 4, in which the open side is formed opposite the fold line connecting the first and the second plate-type elements to each other.

6. Method according to claim 4, in which the fold line of the basic element is positioned in such a way that at the open side of the display unit the second plate-type element is provided with an edge part projecting beyond the first plate-type element.

7. Method according to claim 6, in which the second plate-type element is provided with a second fold line, for folding the edge part of the second plate-type element projecting beyond the first plate-type element in the direction of the first plate-type element.

8. Method according to claim 1, in which, simultaneously with the moulding-on of the frame, an antislip profile is moulded onto the side of the first plate-type element facing away from the second plate-type element.

9. Display unit, comprising a first plate-type element and a second plate-type element made of transparent material, situated essentially parallel to the first plate-type element and serving as a window, which plate-type elements are connected to each other, with the exception of one side, by a frame made of flexible material which is moulded in an undetachable manner onto both plate-type elements by injection moulding, in which at the side which is detached from the first plate-type element the second plate-type element has an edge part which projects beyond the first plate-type element, and together with the adjacent side of the first plate-type element bounds an opening for inserting and removing a replaceable picture carrier of sheet-like or film-like material between the plate-type elements.

10. Display unit according to claim 9, in which the second plate-type element has a fold line along which the edge part of the second plate-type element projecting beyond the first plate-type element is folded in the direction of the first plate-type element.

11. Display unit according to claim 9, in which an antislip profile is provided at the side of the first plate-type element facing away from the second plate-type element.

12. Display unit according to claim 11, in which the antislip profile is made of the same material as the frame of flexible material.

* * * * *

UNITED STATES PATENT AND TRADEMARK OFFICE
CERTIFICATE OF CORRECTION

PATENT NO.    : 6,022,599          Page 1 of 2
DATED         : February 8, 2000
INVENTOR(S)   : Matthijs Alphons Rietveld and Martin Cornelis Meijers It is certified that error appears in the above-identified patent and that said Letters Patent is hereby corrected as shown below:

Title page,
Insert: -- [73] Assignee: Galahad Reklameobjekten B.V.
                         Delft, The Netherlands --

Change "[30] Foreign Application Priority Data
        Oct. 20, 1995    [NL]    Netherlands.......1001454
        Jul. 26, 1995    [NL]    Netherlands..........1003691
        Oct. 15, 1996    [W0]    WIPO.........PCT/NL96/00398"
to:
--           Related U.S. Application Data
  [63] Continuation of Application No. PCT/NL 96/00398,
       October 15, 1996, abandoned. --
-- [30]       Foreign Application Priority Data
       Oct. 20, 1995  [NL]  Netherlands .......1001454
       Jul. 26, 1995  [NL]  Netherlands........1003691 --

ABSTRACT,
Line 11, "place" should be -- placed --.

Column 1,
Line 3, insert:
        -- BACKGROUND OF THE INVENTION
            Cross-Reference to Related Applications
            This application is a continuation application of
            PCT/NL 96/00398 filed October 15, 1996, now abandoned.
            1. Field of the Invention. --
Line 5, delete "according to the preamble of claim 1" and insert:
        -- comprising a first plate-type element and a second plate-type
element made of transparent material --.
Line 6, before "FR" 758,864" insert:
        -- 2. Description of the Prior Art. --
Line 23, before "The object" insert:
        -- SUMMARY OF THE INVENTION --

UNITED STATES PATENT AND TRADEMARK OFFICE
CERTIFICATE OF CORRECTION

PATENT NO. : 6,022,599
DATED : February 8, 2000
INVENTOR(S) : Matthijs Alphons Rietveld and Martin Cornelis Meijers It is certified that error appears in the above-identified patent and that said Letters Patent is hereby corrected as shown below:

Column 1 cont'd,
Line 27, after "by a method" delete "According to the preamble of claim 1."
Line 63, before "Further advantages" insert:
-- BRIEF DESCRIPTION OF THE DRAWINGS --

Column 2,
Line 19, before "The display unit" insert:
-- DESCRIPTION OF THE PREFERRED EMBODIMENT(S) --

Column 3,
Line 38, after "and" delete ".".

Column 4,
Line 32, after "forms" change "an" to -- a --.

Signed and Sealed this

Thirtieth Day of July, 2002

Attest:

JAMES E. ROGAN
Attesting Officer     Director of the United States Patent and Trademark Office